Dec. 4, 1962 R. C. MOORE 3,067,293

SINGLE CHANNEL STEREOPHONIC BROADCASTING SYSTEM

Filed Nov. 19, 1959 4 Sheets-Sheet 1

INVENTOR.
ROBERT C. MOORE
BY Robert D. Sanborn
ATTORNEY

Dec. 4, 1962 R. C. MOORE 3,067,293

SINGLE CHANNEL STEREOPHONIC BROADCASTING SYSTEM

Filed Nov. 19, 1959 4 Sheets-Sheet 2

INVENTOR.
ROBERT C. MOORE
BY
Robert D. Sanborn
ATTORNEY

INVENTOR.
ROBERT C. MOORE
BY
Robert D. Sanborn
ATTORNEY

SINGLE CHANNEL STEREOPHONIC BROADCASTING SYSTEM

Filed Nov. 19, 1959 4 Sheets-Sheet 4

INVENTOR.
ROBERT C. MOORE
BY
Robert D. Sanborn
ATTORNEY

United States Patent Office 3,067,293

Patented Dec. 4, 1962

3,067,293

SINGLE CHANNEL STEREOPHONIC BROADCASTING SYSTEM

Robert C. Moore, Huntingdon Valley, Pa., assignor, by mesne assignments, to Philco Corporation, Philadelphia, Pa., a corporation of Delaware Filed Nov. 19, 1959, Ser. No. 854,160
10 Claims. (Cl. 179—15)

The present invention relates to signal broadcasting systems and more particularly to systems for broadcasting two separate stereophonic program signals over a single amplitude modulation radio channel using only one carrier frequency.

Since single channel stereophonic signals may be broadcast over channels assigned to monophonic broadcasting stations, it is essential that the stereophonic signal be compatible with existing monophonic receivers. That is, envelope detection of the stereophonic signal should give a signal which represents with a minimum of distortion the sum of the two stereophonic program signals. Existing monophonic amplitude modulation receivers may then reproduce the stereophonic broadcast as a monophonic signal which includes all of the program intelligence except the stereo separation of the two channels.

If the two stereophonic program signals to be broadcast over a single amplitude modulation channel are modulated on separate quadrature phase carrier signals and then linearly combined, the envelope detection of this signal will represent the true sum signal only if there is no difference between the stereophonic program signals at the source. The presence of a difference signal will introduce even harmonic distortion into the envelope detected sum signal. The amount of this distortion will be a function of the amplitude of the difference signal.

A second system for single channel stereophonic broadcasting has been proposed in which the sum signal and difference signal are supplied to two single sideband suppressed carrier modulators which receive reference carrier waves in quadrature phase. The suppressed carrier output signals of these two modulators are added to a carrier of fixed amplitude. It can be shown that the signal produced by a system of this type is substantially identical to the signal provided by modulating the two carrier signals directly with the two program signals. Therefore, either of these systems will produce the same amount of distortion in a monophonic receiver. Systems have been proposed in which the carrier wave is amplitude modulated by the stereophonic sum signal only and frequency modulated by the difference signal. Envelope detection of the signals provided by such systems will produce the desired monophonic signal. However, these prior systems are subject to the disadvantage that a relatively wide spectrum space is required in order to achieve an acceptable signal-to-noise ratio at the receiver.

Therefore it is an object of the present invention to provide an improved system for broadcasting stereophonic program signals which are truly compatible with existing monophonic receivers.

Another object of the present invention is to provide a system of single channel stereophonic broadcasting which requires a minimum amount of spectrum space for an acceptable signal-to-noise ratio.

It is a further object of the present invention to provide a system for broadcasting stereophonic program signals which will permit simpler and less expensive stereophonic receivers to be employed.

An additional object of the present invention is to provide an improved system for broadcasting stereophonic signals which is so arranged that the sum of the two stereophonic program channels may be recovered without distortion by means of an envelope detector.

These and other objects of the present invention are achieved by providing in the stereophonic transmitter a correction circuit which compares the amplitude component of the signal to be transmitted with the signal which will provide distortion-free monophonic reception and then modifies the phase and amplitude components of the carrier wave so that the amplitude component has the desired value while the component of the transmitted signal which is in phase quadrature with the carrier wave remains unchanged.

For a better understanding of the present invention together with other and further objects thereof, reference should now be made to the following detailed description which is to be read in conjunction with the accompanying drawing in which.

Figure 1:
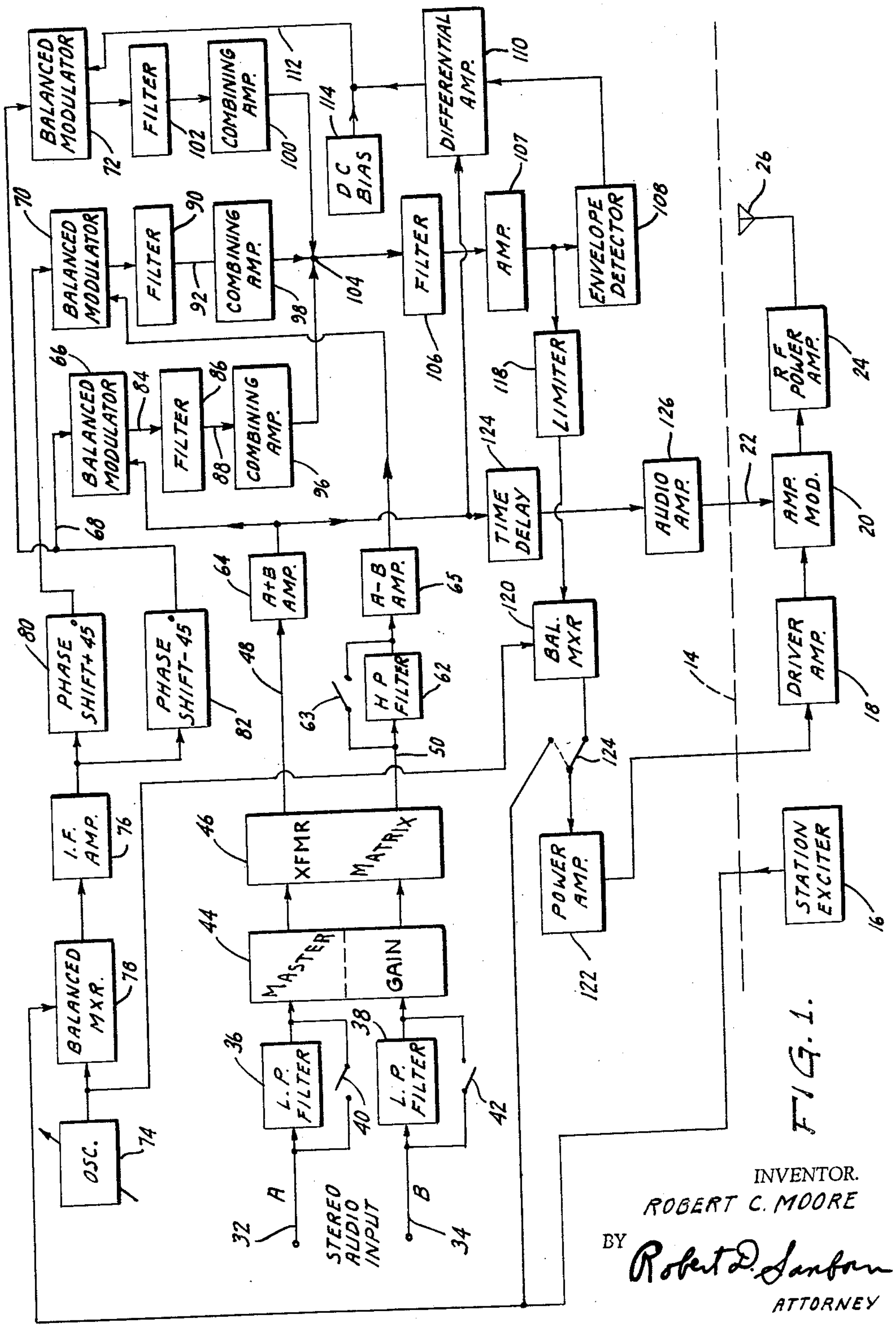
FIG. 1 is a block diagram of one preferred embodiment of the invention.

Since many stereophonic broadcasting installations will be achieved by modifying existing monophonic amplitude modulation radio broadcasting systems to transmit stereophonic program information the preferred embodiment of the invention illustrated in FIG. 1 is in the form of a universal pilot transmitter which will adapt existing monophonic stations for stereophonic broadcasting. However, the inventive concept is equally applicable to new installations designed solely for stereophonic broadcasting.

In FIG. 1 the circuits below the broken horizontal line 14 are those circuits normally found in low level modulation broadcasting stations. The station exciter 16 is a stable oscillator which operates at the carrier frequency assigned to the radio station. In a monophonic transmitter the output of exciter 16 is supplied to the input of driver amplifier 18 which may include a limiter (not shown) for holding the amplitude of the unmodulated carrier at the desired level. The output of driver amplifier 18 is supplied to the carrier signal input of the amplitude modulator 20. Modulator 20 receives the audio frequency program signal on input 22. The amplitude modulated radio frequency carrier signal supplied by modulator 20 is amplified by radio frequency power amplifier 24 and then supplied to the station antenna 26.

The portion of the circuit lying above the broken line 14 of FIG. 1 comprises the universal adapter which permits the radio station to broadcast either monophonic or stereophonic program information. The two stereophonic audio frequency program signal sources associated with the transmitter are illustrated schematically by the letters A and B on inputs 32 and 34 respectively in FIG. 1. In the description which follows, inputs 32 and 34 will be identified as the A input and B input, respectively. It will be understood that in the usual radio station several different sources of stereophonic program signals will be available. For example, spaced microphones will be provided for live pickup. Tape reproducers and disc reproducers will be provided for recorded program material.

Filters 36 and 38 in FIG. 1 limit the maximum frequency of the audio signal so that the sidebands of the modulated carrier wave stay within the alloted frequency band. In a typical embodiment of the invention, filters 36 and 38 will have a cutoff frequency of approximately 8 kilocycles. Switches 40 and 42 are provided for bypassing filters 36 and 38. These switches may be closed and filters 36 and 38 bypassed if the adapter of FIG. 1 is associated with a so-called high-fidelity broadcasting station having greater than the normal 20 kc. broadcast channel.

Master gain control 44 of FIG. 1 preferably includes means for adjusting the gain of each audio channel individually and also for adjusting the gains of the A and B channels simultaneously. This may be accomplished by providing suitable attenuators or gain controlled amplifiers in each channel.

The transformer matrix 46 of FIG. 1 combines the A and B stereophonic program signals to provide at output connection 48 on audio signal $(A+B)$ representative of the sum of the two signals on inputs A and B. Matrix 46 provides a second audio signal $(A+B)$ at output connection 50 which is representative of the difference of the program signals on inputs A and B respectively.

Figure 1A:
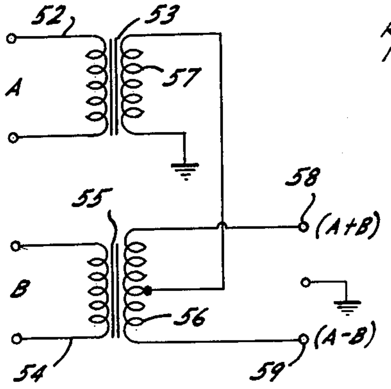
FIG. 1A is a schematic diagram of the transformer matrix 46 of FIG. 1.

One preferred form of signal matrix is shown in FIG. 1A. The A program signal is supplied to the primary winding 52 of an audio transformer 53. The B program signal is supplied to the primary winding 54 of a second transformer 55. Transformer 55 has a center tapped secondary winding 56. The secondary winding 57 of transformer 53 is connected between ground and center tap of windings 56. The sum signal $(A+B)$ appears between terminal 58 of winding 56 and ground. The difference signal $(A+B)$ appears between the terminal 59 of winding 56 and ground.

Other forms of signal matrix circuits which will accomplish the same combination of the two input signals may be substituted for the circuit shown in FIG. 1A.

It is known in the stereophonic art that very little stereophonic separation can be detected by the average listener for signals in the low audio frequencies. Therefore, it is the practice to apply the low frequency signals, say below 300 cycles per second, to both audio reproducers as a monophonic signal. It can be shown that the two output channels at the receiver will be supplied with common, i.e., monophonic, program information if the low frequencies are deleted from the difference channel. This is accomplished in the circuit of FIG. 1 by high pass filter 62 which has a cutoff frequency of the order of 300 cycles per second. A switch 63 is provided for bypassing filter 62 if desired. Amplifiers 64 and 65 are buffer amplifiers for the sum and difference channels respectively.

A double heterodyne circuit is provided in the embodiment of FIG. 1 so that balanced modulators 66, 70 and 72 may operate at a convenient intermediate frequency. This arrangement also permits modulators 66, 70 and 72 to operate at a fixed frequency regardless of the carrier frequency of the broadcast station with which the circuit is employed. Variable frequency oscillator 74 provides a carrier wave at a frequency which differs from the frequency of the carrier wave provided by station exciter 16 by some convenient intermediate frequency. In a typical embodiment of the invention, oscillator 74 would be tuned to a frequency approximately 350 kilocycles removed from the frequency provided by station exciter 16. The output of oscillator 74 and the output of station exciter 16 are connected to the two inputs of a balanced mixer 78. Intermediate frequency amplifier 76 selects only the heterodyne difference component from mixer 78. The means for reheterodyning the signal to the station carrier frequency will be described presently. The intermediate frequency amplifier 76 supplies the intermediate frequency carrier wave to phase shifters 80 and 82. Phase shifters 80 and 82 each shift the phase of the signal supplied by amplifier 76 by 45 degrees but in the opposite directions. Therefore the signals at the output of phase shifters 80 and 82 are in phase quadrature. The output of phase shifter 82 is supplied to the input 68 of balanced modulater 66. It is also supplied to the carrier wave input of modulator 72. Phase shifter 80 is coupled to the carrier wave input of balanced modulator 70. Balanced modulator 66 is balanced for the carrier wave so that the signal at ouput 84 comprises only the upper and lower sidebands of the carrier wave supplied at 68 and the $(A+B)$ signal supplied by amplifier 64. Filter 86 is peaked at the frequency of the signal supplied by amplifier 76 so that it blocks the audio frequency signal $(A+B)$ and passes only the upper and lower sidebands of the carrier wave to connection 88. Similarly, balanced modulator 70 provides a suppressed carrier signal representative of the difference signal supplied by amplifier 66. The signal appearing at output 92 of filter 90 comprises only the upper and lower sidebands of the carrier wave supplied by modulater 70. Modulator 72 in FIG. 1 provides both a reference carrier wave and a correction signal which appears as sideband components of the carrier wave. Therefore filter 102 is peaked at the frequency of the carrier wave supplied by amplifier 76.

Combining amplifiers 96, 98 and 100 together form a signal adder circuit which combine the outputs of filters 86, 90 and 102 into a single signal at the common output connection 104. In a typical embodiment of the invention, amplifiers 96, 98 and 100 may comprise three triode stages having a common tuned load impedance. Filter 106 which receives the combined outputs of amplifiers 96, 98 and 100 has a double peaked response with a dip at the frequency of carrier wave supplied by amplifier 76. Filter 106 together with filters 86, 90 and 102 provide an overall flat response for the frequency band occupied by the sideband components supplied by modulators 66, 70 and 72.

As mentioned above, the audio frequency input signals to modulators 66 and 70 respectively are derived from amplifiers 64 and 65 respectively. The audio frequency input to modulator 72 is derived from a feedback loop having one input derived from filter 106 and a second input derived from amplifier 64. This feedback loop comprises an amplifier 107 coupled to filter 106. The output of amplifier 107 is supplied to an envelope detector 108. A differential amplifier 110 receives one input from envelope detector 108 and a second input from amplifier 64. The connection 112 from differential amplifier 110 to modulator 72 provides a D.C. path as well as a path for the audio frequency signal. An adjustable bias source 114 provides means for unbalancing the modulator 72 so that a predetermined amplitude of carrier wave appears at the output of combining amplifier 100. Differential amplifier 110, modulator 72 and bias source 114 are shown in more detail in FIG. 1C.

As will be shown later, the signal appearing at the output of filter 106 corresponds to the signal to be broadcast in every respect except carrier frequency. This could be accomplished by heterodyning the signal to the appropriate carrier frequency amplifying the heterodyne signal and then supplying it to the system antenna. It lies within the present inventive concept to broadcast the signal in this fashion. However, in the embodiment of FIG. 1 the phase modulation components and the amplitude modulation components of this signal are treated separately.

The intermediate frequency signal appearing at the output of filter 106 is passed through a limiter 118 which removes all amplitude modulation from this signal. Thus the signal at the output of limiter 118 is a fixed amplitude intermediate frequency signal which has a phase corresponding to the phase of the signal supplied by filter 106. The output of limiter 118 is supplied to one input of a balanced mixer 120. Mixer 120 receives a second input from the output of variable frequency oscillator 74. Mixer 120 is the second heterodyne unit in the double heterodyne system mentioned above. Power amplifier 122 has a passband which will accept only the sum frequency of the two signals supplied to balanced mixer 120. It will be seen that this sum frequency is equal to the frequency of the signal supplied by station exciter 16. It can be shown that the phase of the signal at the output of amplifier 122 is determined solely by the phase of the signal supplied by exciter 16 and the phase of the signal supplied by limiter 118. The phase and frequency contributions of oscillator 74 are cancelled out in the double heterodyne process. The output of power amplifier 122 is supplied to the input of driver amplifier 18. A switch 124 is provided for connecting the input of power amplifier 122 either to the output of balanced mixer 120 for stereophonic broadcasting or to the output of station exciter 16 when monophonic programs are to be broadcast.

The amplitude component of the signal appearing at the output of filter 106 may be supplied to modulator 20 in several ways. The audio frequency signal which appears at the output of envelope detector 108 may be supplied to input 22 through a suitable time delay circuit. Alternatively, the sum signal $(A+B)$ of amplifier 64 may be connected to input 22 by way of time delay circuit 124 and amplifier 126. It will be shown later that the signal appearing at the output of envelope detector 108 is held equal to the sum signal $(A+B)$ by the correction circuit. Time delay 124 is provided to compensate for the unavoidable relays which are present in the modulation, remodulation and amplifier circuits in the phase component path.

This completes the description of the preferred embodiment of FIG. 1. However, the detailed circuits of FIGS. 1B and 1C will be described before proceeding to a description of the operation of the embodiment of FIG. 1.

Figure 1B:
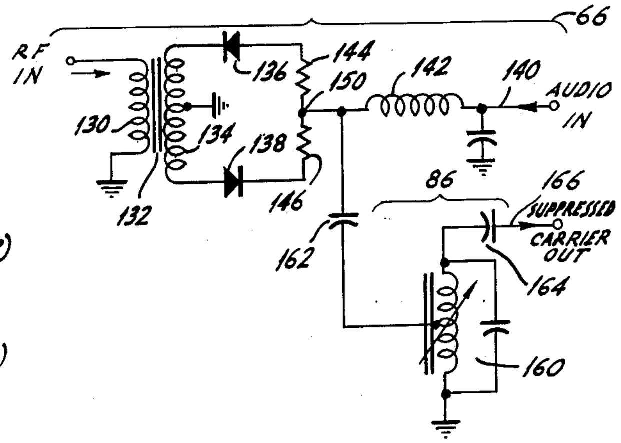
FIG. 1B is a schematic diagram of the balanced modulator 70 of FIG. 1.

FIG. 1B shows a balanced modulator and filter of the type which may be employed, for example, as balanced modulator 66 and filter 86 in FIG. 1. The radio frequency signal from phase shifter 82 is supplied to the primary winding 130 of a transformer 132. Transformer 132 has a center tap secondary winding 134 so that the carrier wave signal is supplied in opposite phase to the oppositely poled diodes 136 and 138. The sum signal from amplifier 64 is supplied to input connection 140. A choke 142 is provided for excluding radio frequency signals from input lead 140. Choke 142 is connected through equal resistors 144 and 146 to the anode of diode 136 and the cathode of diode 138, respectively. Therefore the audio signal is supplied in the same phase to diodes 136 and 138. The signal appearing at junction 150 of resistors 144 and 146 comprises the audio signal supplied at input 140 and the upper and lower sidebands only of the carrier wave supplied to primary winding 130. The balanced configuration of the mixer excludes the carrier wave supplied at primary 130 from the connection at 150. The parallel inductance-capacitance filter 160 together with coupling capacitors 162 and 164 block the audio frequency signal and pass the double sideband suppressed carrier signal to output connection 166. Output connection 166 of FIG. 1B corresponds to output connection 88 of FIG. 1.

Figure 1C:
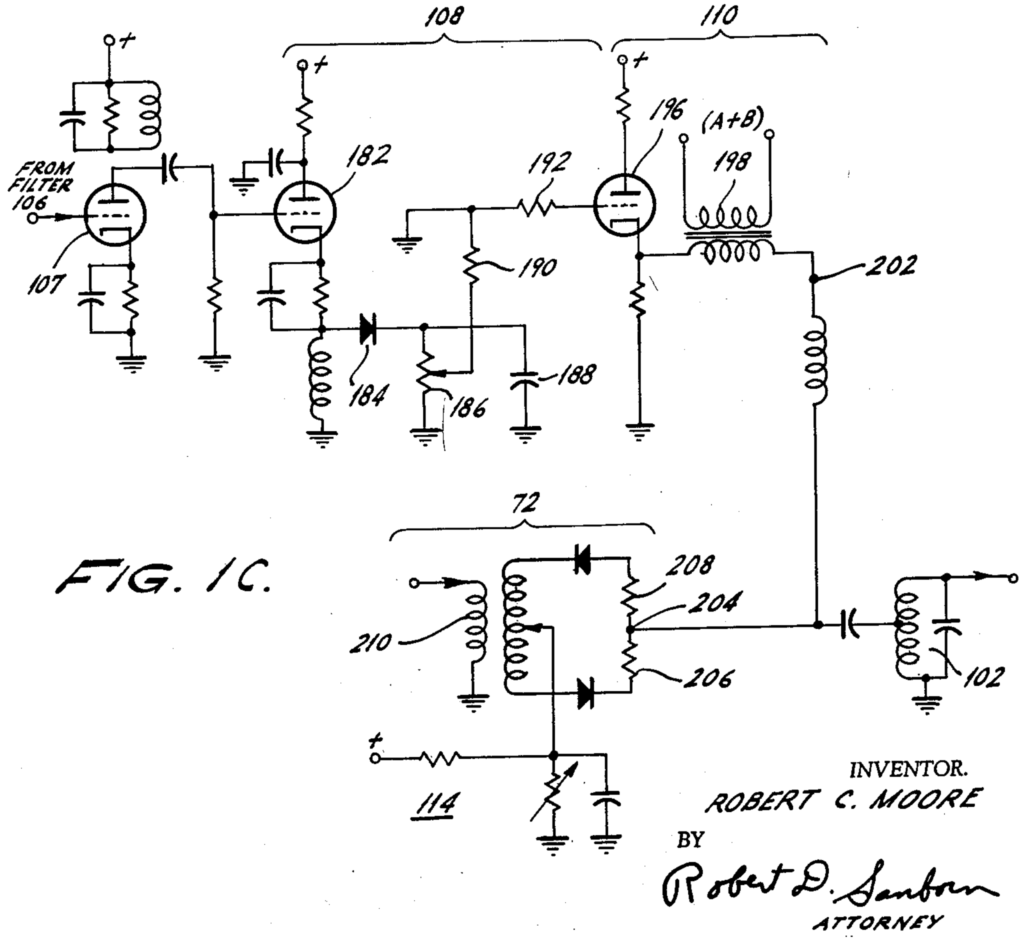
FIG. 1C is a schematic diagram of the differential amplifier, bias source and balanced modulator associated with the error correction channel.

FIG. 1C shows in more detail amplifier 107, envelope detector 108, differential amplifier 110, bias source 114, balanced modulator 72 and filter 102 of FIG. 1. As shown in FIG. 1C amplifier 107 is a conventional intermediate frequency amplifier. For optimum operation of the system, amplifier 107 should have a relatively high gain, for example, a voltage gain of ten or more. The output of amplifier 107 is connected to the input of a cathode follower 182 which forms a low impedance drive circuit for the diode 184 in envelope detector 108. Resistor 186 and capacitor 188 form the audio frequency load for envelope detector 108. The output of detector 108 is coupled for direct current and audio frequency through resistors 190 and 192 to the grid of a cathode loaded amplifier stage 196. Resistor 190 is connected to an adjustable tap on resistor 186 so that the overall gain of the circuit from input 180 to the grid of tube 196 can be adjusted. The sum signal from amplifier 64 is supplied to the primary winding of transformer 198. Transformer 198 should have a voltage step-up ratio approximately equal to the gain of amplifier 180. The transformer 198 is so poled that the signal appearing at point 202 is equal to the difference between the signal supplied by envelope detector 108 of FIG. 1 and the sum signal $(A+B)$ supplied by amplifier 64. As will be explained in more detail presently, this error signal will always be of the same polarity. Therefore point 202 is coupled for direct current signals to the junction 204 between resistors 206 and 208 in balanced modulator 72 in order to preserve the direct current component of the error signal. Modulator 72 receives the carrier wave signal by way of transformer 210. Modulator 72 shown in FIG. 1C is similar to modulator 66 shown in FIG. 1B except the center tap of transformer 210 is connected to ground through adjustable bias source 114. The direct current bias voltage supplied by source 114 unbalances the modulator 72 for direct current and causes a controllable amount of carrier signal to appear at junction 204. The amplitude of this carrier signal can be adjusted independently of the amplitude of the sideband signals present at the junction 204 by controlling the amplitude of the bias supplied by source 114. Filter 102 of FIG. 1C may be identical in its arrangement to the filter 86 shown in FIG. 1B.

The operation of the system of FIG. 1 will now be described with reference to the diagrams of FIGS. 2 through 4.

Figure 2:
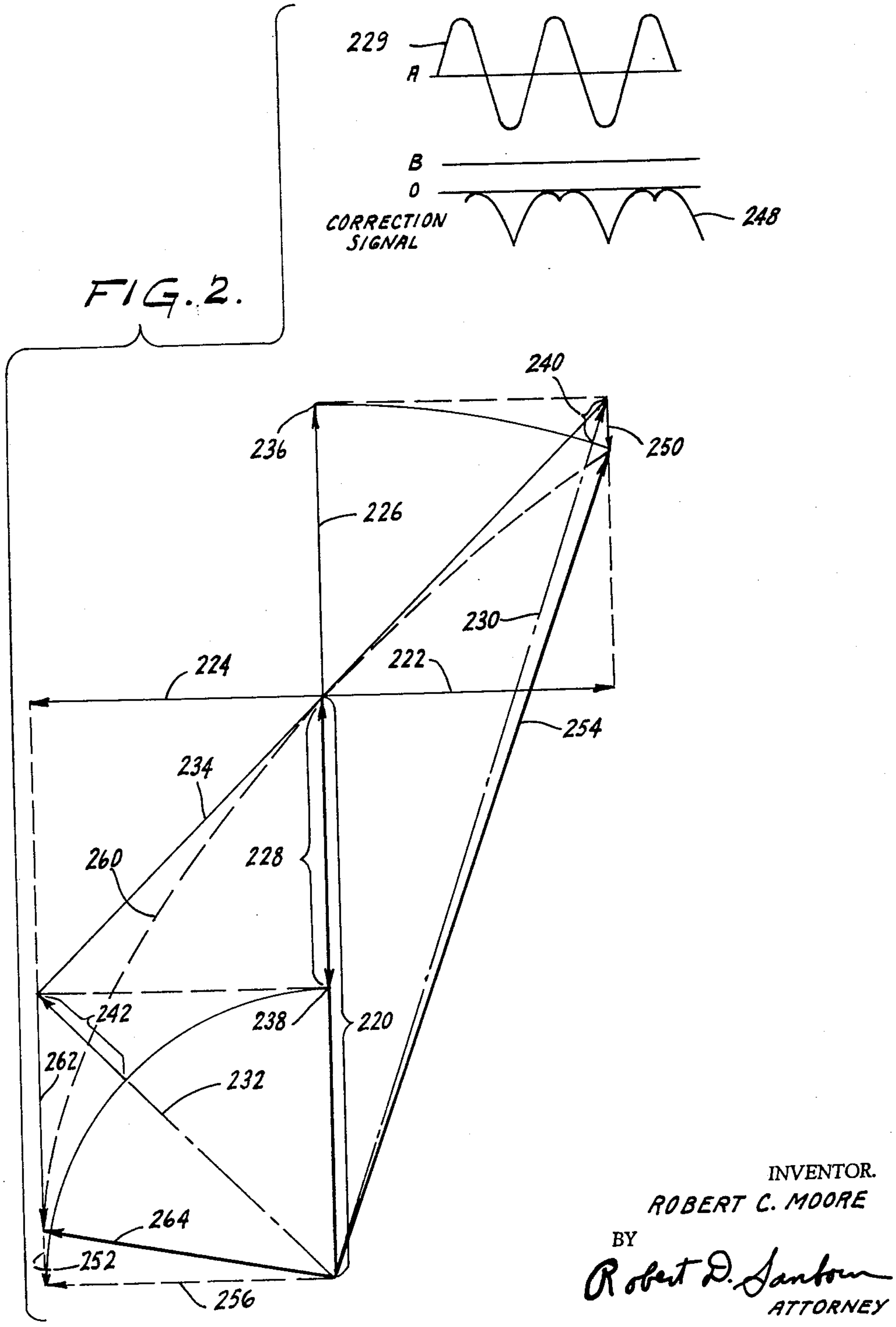
FIG. 2 is a series of diagrams which illustrate the operation of the system in which one stereophonic signal is at zero amplitude.

The diagram of FIG. 2 assumes that the amplitude of the signal at input A has a value which will produce 50% modulation of the signal at amplitude modulator 20. A sinusoidal waveform is assumed for convenience but it is to be understood that the operation will be the same for any complex audio frequency waveform supplied to input A. It assumes further that the signal on the B input is zero. Thus the sum signal $(A+B)$ and the difference signal $(A-B)$ are equal for condition assumed in FIG. 2. Vector 220 in FIG. 2 represents the reference amplitude carrier wave supplied by modulator 72. Vector 222 represents the positive peak excursion of the carrier signal sideband components supplied by modulator 70 which represent the difference signal $(A-B)$. Vector 224 represents the negative peak excursion of the same signal. Vector 226 represents the positive peak excursion of the carrier signal sideband components supplied by modulator 66 which represent the sum signal $(A+B)$. If it is assumed that the output of differential amplifier 110 is disconnected from modulator 72 the signal at the output of filter 106 will be represented by the combination of the vectors 220, 226 and 222 for the positive peaks of the signal 229 of FIG. 2. This combined signal is represented by the broken line vector 230 in FIG. 2. At the instant that the signal at input A is passing through zero, the sum and difference signals will be zero and the amplitude of the signal appearing at the output of filter 106 will be that represented by vector 220 alone. When the signal at input A is at its negative peak, the signal at the output of filter 106 will be equal to the vector sum of vectors 220, 228 and 224. This combined signal is represented by the broken line vector 232. Thus the locus of the vectors representing the output of filter 106 will lie along the straight line 234.

Heretofore it has been proposed to transmit directly a signal corresponding to a signal represented by vectors having the locus 234. True stereophonic reproduction can be obtained by synchronously demodulating such a signal with two quadrature phased synchronous demodulators. However the signal represented by vectors having the locus 234 is not truly compatible with monophonic receivers.

An envelope detector responds only to the variation in length of the signal vector as it moves along the locus 234. Thus the signal provided by a monophonic receiver would vary between the limits represented by vector 232 and vector 230. The distortionless reproduction of the two program signals by a monophonic receiver would require that the amplitude of the signal vector vary between the limits of amplitude represented by points 236 and 238. These points represent the variations in amplitude of the vector 220 when modulated by the sum signal alone. It will be seen from FIG. 2 that, on the positive peak of the signal at input A, the signal appearing at the output of filter 106 exceeds the true sum signal by the amount 240. On the negative peaks the signal at the output of filter 106 exceeds the true sum signal by the amount 242. When the signal at input A is zero, the signal at the output of filter 106 is the proper amplitude to represent the sum signal. Therefore the variation between the actual amplitude of a vector having a locus 234 and the amplitude of a vector representing the true sum of the signal supplied at the A and B inputs is represented by curve 248 in FIG. 2. This difference will appear in the output of a monophonic receiver as even harmonic distortion.

The differential amplifier 110 provides at connection 112 an error signal which is proportional to the difference between the sum signal $(A+B)$ supplied by amplifier 64 and the envelope of the signal occurring at the output of filter 106. However, because of the gain of the amplifier 107 and transformer winding 198 of FIG. 1C, the signal appearing at the output of amplifier 112 will have a much greater amplitude than the difference between the two previously mentioned signals. Modulator 72 of FIG. 1 provides a correction signal in the form of a suppressed carrier signal which is proportional to the error signal present on connection 112. This correction signal is in addition to the carrier wave previously described. Since modulator 72 is supplied with an input carrier wave which is in phase with the signal supplied to the balanced modulator 66, the correction signal will be in phase with the sum vectors 226 and 228. The vector 250 in FIG. 2 represents the correction signal supplied by modulator 72 on the positive peaks of the signal at input A. Vector 252 in FIG. 2 represents a correction signal which would be supplied by modulator 72 for a very large gain in the feedback channel between amplifier 107 and modulator 72. It will be seen that the addition of vectors 250 and 252 to the vectors 230 and 232, respectively, will produce the sum vectors 254 and 256. With the addition of the correction signal, the total signal appearing at the output of filter 106 will have a locus along the curved line 260 rather than along the straight line 234. It will be seen from FIG. 2 that the amplitude modulation of a signal vector following locus 260 will exactly represent the sum signal $A+B$. Thus curve 248 in FIG. 2 also represents the correction signal supplied by modulator 72.

It will be noticed also that the addition of the correction signals 252 and 250 has not altered the component of the signal vector which is in phase quadrature with carrier wave vector 220. Since a synchronous detector supplied with a properly phased reference carrier wave responds only to the quadrature component of the signal and not to its angle with the carrier wave vector, the difference signal represented by vectors 222 and 224 recovered at a receiver from vectors 254 and 256 will be the same as that recovered from vectors 230 and 232.

The effect of a limited gain in the feedback loop will be to cause the correction signal to have a value such as that shown by the solid vector 262 rather than that represented by the broken vector 252. Thus the actual signal appearing at the output of filter 106 will have vector 264 as one extreme limit. The difference in amplitude between vectors 256 and 264 is negligible. Furthermore this difference can be made as small as desired by increasing the gain for the feedback channel. Since the correction circuit is a feedback loop which may have a relatively high gain and an appreciable signal delay or phase shift, the usual precautions should be observed in the design of the loop so that feedback does not become positive and the loop regenerative at any frequencies within the band of interest.

The operation of the means by which the signal at the output of filter 106 is caused to modulate the phase of the signal supplied to amplifier 18 has been described above.

It can be shown that the addition of the correction signal has the effect of adding harmonic frequencies, particularly the second harmonic frequency, to the composite signal appearing at the output of filter 106 and consequently in the broadcast signal. This tends to increase the spectrum space required for the transmission of the composite stereophonic signal. However the composite signal can be confined to the portion of the spectrum space or channel bandwith allotted to a monophonic broadcasting station by limiting the maximum frequency of the correction signal. Thus if no correction signal is added for frequencies above say 5000 cycles per second there will be no significant harmonic components above 10,000 cycles per second. The limiting of the frequency of the correction signal may be accomplished either by causing filter 102 to have an appropriately narrow bandwidth or by placing a low pass filter, such as a series resistor and a shunt capacitor in the connection between differential amplifier 110 and modulator 72.

Limiting the maximum frequency of the correction signal will not produce any distortion of the signal in a monophonic receiver if the audio signal employed to amplitude modulate the carrier is derived from amplifier 64 as shown in FIG. 1. It will produce a small change in the phase of the signal at the output of limiter 118 and hence a slight change in the stereophonic separation at the stereophonic receiver. This change will be negligible for several reasons. The peak amplitude of signals above 5000 cycles is relatively low and hence the percentage modulation of the carrier wave at these frequencies is relatively low. FIGS. 2 and 3 illustrate that the amplitude of the correction signal drops rapidly as the percentage modulation of the carrier wave decreases. FIG. 3 is a series of diagrams similar to FIG. 2 except that amplitude of the A signal 267 is such that the amplitude sum and difference signals are equal to only 30% of the unmodulated carrier wave. It will be seen that the correction signal 269 has the same form as signal 248 of FIG. 2 but is considerably smaller in amplitude. Furthermore there is a loss of the stereophonic effect at higher frequencies due to the ambiguity of the absolute phase of the two stereophonic signals.

Figures 3, 4:
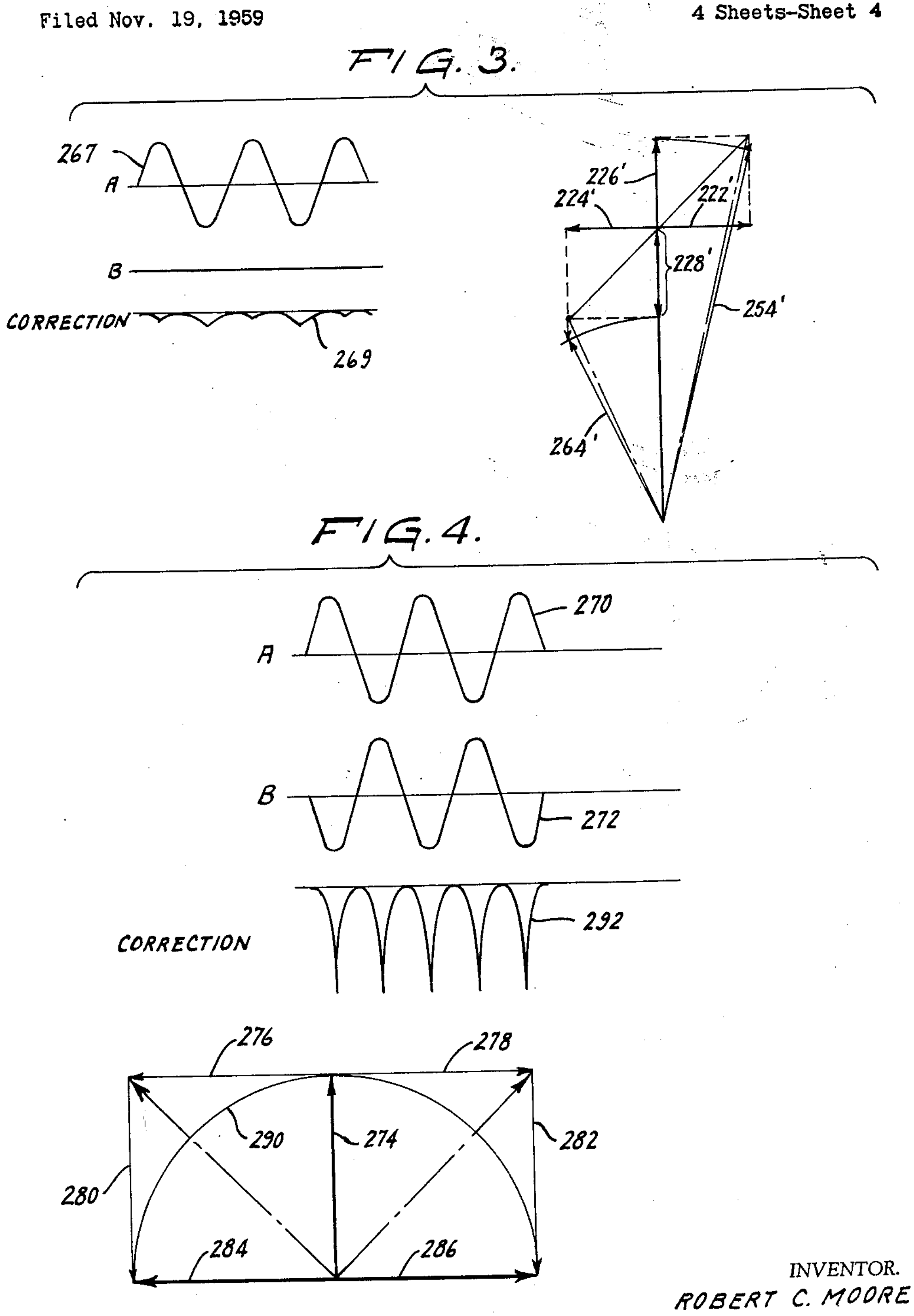
FIG. 3 is similar to FIG. 2 and illustrates the effect of a decrease in the peak to peak amplitude of the one stereophonic input signal.
FIG. 4 is a series of diagrams showing the operation of the system when the two audio frequency input signals are of equal amplitude but opposite phase.

FIG. 4 illustrates the operation of the circuit of FIG. 1 when the signal at input A, as represented by sine wave 270, is equal in amplitude but opposite in phase to the signal 272 which is supplied to input B. Under the conditions assumed for FIG. 4, the sum signal $(A+B)$ will always be zero and the difference signal $(A-B)$ will be equal to twice the signal 270 supplied to input A. Vector 274 in FIG. 4 represents the unmodulated carrier signal. Vectors 276 and 278 represent the negative and positive excursions respectively of the difference signal. Vectors 280 and 282 represent the correction signal supplied by modulator 72. The time variation of the correction signal for sinusoidal signals supplied to inputs A and B is represented by the curve 292 in FIG. 4. It will be seen that this correction signal has a peak amplitude equal to the amplitude of unmodulated carrier wave 274. The combined signal at the output of filter 106 is represented by the vectors 284 and 286 at the negative and positive excursions of the signal 270. The signal vector has a locus along the circle 290.

If the two signals supplied to inputs A and B of the system of FIG. 1 are of the same amplitude and in phase, there will be no difference signal and hence no correction signal is required. The combined signal at the output of filter 106 will lie along the line of vector 220 of FIG. 2.

It has been mentioned that the signal to be broadcast can be obtained directly from the output of filter 106 by properly heterodyning to the carrier frequency assigned to the broadcast station. Alternatively, balanced modulators 66, 70 and 72 can be designed to operate at the broadcast frequency and the signal from station exciter 16 supplied directly to these modulators through the phase shifters 80 and 82. In such an embodiment oscillator 74, mixers 78 and 120 and amplifier 76 would not be required. If the sum signal $(A+B)$ which is supplied to modulator 66 is supplied instead to the input of modulator 72 in combination with the signals supplied by bias source 114 and differential amplifier 110, balanced modulator 66, filter 86 and combining amplifier 96 may be omitted. A direct current connection has been assumed between differential amplifier and modulator 72. However, it lies within the scope of the invention to provide a connection only for alternating current signals. A suitable D.C. clamping or restoration circuit will then be required at the input of balance modulator 72.

Therefore, while the invention has been described with a reference to a preferred embodiment thereof, it will be apparent that various modifications and other embodiments thereof will occur to those skilled in the art within the scope of the invention. Accordingly, I desire the scope of my invention to be limited only by the appended claims.

What is claimed is:

1. A system for modulating two stereophonic program signals on a single carrier wave, comprising a source of a carrier wave, modulator means responsive to said two program signals and said carrier wave for generating a phase and amplitude modulated signal representable as the sum of first and second component signals, said first component signal being at said carrier wave frequency and at a first phase, said first component signal being amplitude modulated in accordance with the sum of said two program signals, said second component signal being a quadrature phased, carrier suppressed signal having an amplitude modulation component proportional to the instantaneous difference between said two program signals, envelope detector means coupled to the output of said modulator means, a signal comparison circuit coupled to the output of said envelope detector means, means for supplying said two program signals to said signal comparsion circuit, said signal comparsion circuit providing an output signal proportional to the instantaneous difference in amplitude between the sum of said two program signals and the output signal of said envelope detector, and means coupling the output of said signal comparsion means to said modulator means to vary the modulation of said phase and amplitude modulated wave in a manner which varies the amplitude of modulation of said difference signal only and in a direction to reduce said difference.

2. A system for modulating two stereophonic program signals on a single carrier wave comprising a source of a first carrier wave, means responsive to said two stereophonic program signals for causing said first carrier wave to be amplitude modulated substantially in porportion to the instantaneous sum of said two program signals, means responsive to said two program signals for causing said amplitude modulated carrier wave to be modulated in phase, said phase modulation being such that the component of said phase and amplitude modulated wave which is in phase quadrature with the zero signal phase of said phase and amplitude modulated wave is substantially proportional to the instantaneous difference of said two program signals, means responsive to said phase and amplitude modulated first carrier wave for generating a second carrier wave having a phase determined by the phase of said phase and amplitude modulated first carrier wave, and means for amplitude modulating said second carrier wave in accordance with the sum of said two program signals.

3. A system for modulating two stereophonic program signals on a single carrier wave, said system comprising a source of a carrier wave having a reference amplitude and a reference phase, means providing a first signal having carrier frequency sideband components at a phase corresponding to said reference phase and an instantaneous amplitude proportional to the sum of said two program signals, means providing a second signal having carrier frequency sideband components in phase quadrature with said reference phase, said quadrature phased sideband components having an amplitude proportional to the instantaneous difference of said two program signals, means providing a correction signal having carrier sideband components at a phase corresponding to said reference phase, means for combining said carrier wave, said first and second signals and said correction signal, envelope detector means coupled to said combining means for providing a signal corresponding to the envelope of the output signal of said combining means, and means responsive to said envelope signal and said first and second program signals for controlling the amplitude of said correction signal.

4. A system as in claim 3 wherein said last-mentioned means is responsive to the difference between said envelope signal and the sum of said two program signals.

5. A system for modulating two stereophonic program signals on single carrier wave comprising first and second balanced signal modulator means each having a carrier wave input and a signal input, a source of a carrier wave, means for supplying said carrier wave to the carrier wave input of said first modulator means at a first phase and to the carrier wave input of said second modulator means at a second phase which is in quadrature with said first phase, means responsive to said two program signals for providing a difference signal having an instantaneous amplitude proportional to the instantaneous difference in the amplitudes of said two program signals, means for supplying said difference signal to said signal input of said first modulator means, means responsive to said two program signals for providing a sum signal having an instantaneous amplitude proportional to the sum of the instantaneous amplitudes of said two program signals, means for supplying said sum signal to said signal input of said second modulator means, means coupled to said first and second modulator means for combining the signals supplied thereby, means for causing to be supplied to the input of said combining means a carrier wave component of reference amplitude and a carrier wave correction signal, said carrier wave of reference amplitude and said carrier wave correction signal having a phase corresponding to the phase of the output signal of said second modulator means, and means responsive to the instantaneous difference between the amplitude of the envelope of the output signal of said combining means and the amplitude of said sum signal for altering the amplitude of said correction signal in a sense to minimize said last mentioned difference.

6. A modulating system as in claim 5 wherein said means for causing said carrier wave of reference amplitude and said carrier wave correction component to be supplied to said combining means comprises means for supplying to said signal input of said second modulator means a direct current bias signal component of predetermined amplitude and an error signal component proportional to said difference in amplitude between the said sum signal and said envelope of the output signal of said combining means.

7. A modulating system as in claim 6 wherein said second modulating means comprises first and second balanced modulator circuits each having a carrier wave input and a signal input and wherein said sum signal is supplied to said signal input of said first modulator circuit and said error signal component and said direct current bias component are supplied to said signal input of said second balanced modulator circuit.

8. A system for modulating two stereophonic program signals on a single carrier wave, said system comprising first, second and third signal modulator means each having a carrier wave input and a signal input, said first and second modulator means being carrier balanced modulator means, a source of a carrier wave, means for supplying said carrier wave to the carrier wave inputs of said first and said third modulator means at a first phase and to the carrier wave input of said second modulator means at a second phase which is in quadrature with said first phase, means responsive to said two program signals for providing a difference signal having an instantaneous amplitude proportional to the instantaneous difference in the amplitudes of said two program signals, means for supplying said difference signal to said signal input of said second modulator means, means responsive to said two program signals for providing a sum signal having an instantaneous amplitude proportional to the sum of the instantaneous amplitudes of said two program signals, means for supplying said sum signal to said signal input of said first modulator means, signal combining means coupled to said first, second and third modulator means for combining the signals supplied thereby, envelope detector means coupled to the output of said signal combining means, signal difference means having first and second inputs coupled to the output of said envelope detector means and to said means for providing a sum signal, respectively, said signal difference means providing at its output a signal having an instantaneous amplitude indicative of the difference between the instantaneous amplitudes of the signals present at said first and second inputs of said signal difference means, and means coupling the output of said signal difference means to said signal input of said third modulator means.

9. A system as in claim 8, said system further comprising a source of a second carrier wave having a frequency different from the frequency of said first mentioned carrier wave, means responsive to the output of said signal combining means for modulating the phase of said second carrier wave in accordance with the phase of the signal supplied by said signal combining means, and means for amplitude modulating said phase modulated second carrier wave in accordance with the sum of the instantaneous amplitudes of said two program signals.

10. A system as in claim 8 wherein said means coupling the output of said signal difference means to said third modulator means includes a source of direct bias potential, said third modulator means being arranged so that the amplitude of the carrier wave component in the output signal of said third modulator means is proportional to the amplitude of the direct current bias supplied thereto.

References Cited in the file of this patent

UNITED STATES PATENTS

| | | |
|---|---|---|
| 2,233,183 | Roder | Feb. 25, 1941 |
| 2,698,379 | Boelens et al. | Dec. 28, 1954 |
| 2,779,020 | Wilmotte | Jan. 22, 1957 |